(12) United States Patent
Krithivas et al.

(10) Patent No.: US 9,703,697 B2
(45) Date of Patent: Jul. 11, 2017

(54) SHARING SERIAL PERIPHERAL INTERFACE FLASH MEMORY IN A MULTI-NODE SERVER SYSTEM ON CHIP PLATFORM ENVIRONMENT

(71) Applicant: Intel Corporation, Santa Clara, CA (US)

(72) Inventors: Ramamurthy Krithivas, Chandler, AZ (US); Palsamy Sakthikumar, Puyallup, WA (US)

(73) Assignee: Intel Corporation, Santa Clara ( * ) Notice: Subject to any disclaimer, the term of this patent is extended or adjusted under 35 U.S.C. 154(b) by 47 days.

(21) Appl. No.: 13/728,608

(22) Filed: Dec. 27, 2012

(65) Prior Publication Data

US 2014/0189197 A1    Jul. 3, 2014

(51) Int. Cl.
  *G06F 12/02*    (2006.01)
(52) U.S. Cl.
  CPC .. *G06F 12/0246* (2013.01); *G06F 2212/7201* (2013.01); *Y02B 60/1225* (2013.01)
(58) Field of Classification Search
  CPC .......................... G06F 12/0246; G06F 12/1441
  USPC .......................................... 711/147, 153, 163
  See application file for complete search history.

(56) References Cited

U.S. PATENT DOCUMENTS

| | | | |
|---|---|---|---|
| 6,026,481 A | 2/2000 | New et al. | |
| 6,233,681 B1 | 5/2001 | Kang | |
| 6,546,471 B1 * | 4/2003 | Tarui et al. | ................... 711/148 |
| 6,813,522 B1 * | 11/2004 | Schwarm et al. | ................ 700/5 |
| 7,293,173 B2 | 11/2007 | Field | |
| 7,421,688 B1 | 9/2008 | Righi et al. | |
| 7,908,470 B1 | 3/2011 | Cavanna | |
| 7,962,736 B1 | 6/2011 | Polyudov | |
| 8,499,295 B2 | 7/2013 | Selvam | |
| 8,863,309 B2 | 10/2014 | Wang et al. | |
| 2003/0051125 A1 | 3/2003 | Lu | |
| 2003/0074657 A1 | 4/2003 | Bramley, Jr. | |
| 2004/0093359 A1 | 5/2004 | Sharpe et al. | |
| 2004/0139310 A1 | 7/2004 | Maeda et al. | |
| 2005/0021933 A1 | 1/2005 | Wang et al. | |
| 2005/0108515 A1 | 5/2005 | Rangarajan et al. | |
| 2005/0204123 A1 | 9/2005 | Lee | |
| 2005/0210228 A1 | 9/2005 | Miller et al. | |
| 2005/0223209 A1 | 10/2005 | Chang | |

(Continued)

OTHER PUBLICATIONS

Office Action received for U.S. Appl. No. 13/536,449, mailed on Dec. 4, 2014.

(Continued)

*Primary Examiner* — Midys Rojas
*Assistant Examiner* — Stephanie Wu
(74) *Attorney, Agent, or Firm* — Alpine Technology Law Group LLC

(57) ABSTRACT

Methods and apparatus related to sharing Serial Peripheral Interface (SPI) flash memory in a multi-node server SoC (System on Chip) platform environment are described. In one embodiment, multi-port non-volatile memory is shared by a plurality of System on Chip (SoC) devices. Each of the plurality of SoC devices comprises controller logic to control access to the multi-port non-volatile memory and/or to translate a host referenced address of a memory access request to a linear address space and a physical address space of the multi-port non-volatile memory. Other embodiments are also disclosed and claimed.

26 Claims, 6 Drawing Sheets

(56) References Cited

U.S. PATENT DOCUMENTS

| | | |
|---|---|---|
| 2005/0283598 A1 | 12/2005 | Gaskins et al. |
| 2006/0010264 A1 | 1/2006 | Rader et al. |
| 2006/0015861 A1 | 1/2006 | Takata et al. |
| 2006/0020780 A1 | 1/2006 | Hobson |
| 2006/0136703 A1 | 6/2006 | Wisecup et al. |
| 2006/0248327 A1 | 11/2006 | Chang et al. |
| 2006/0253555 A1 | 11/2006 | Leung |
| 2007/0050586 A1* | 3/2007 | Shin .................. G06F 12/1466 711/163 |
| 2007/0055853 A1 | 3/2007 | Hatasaki et al. |
| 2007/0113067 A1 | 5/2007 | Oh et al. |
| 2007/0157051 A1 | 7/2007 | Hernandez et al. |
| 2007/0174603 A1 | 7/2007 | Wang |
| 2007/0186086 A1 | 8/2007 | Lambert et al. |
| 2007/0234123 A1 | 10/2007 | Shih et al. |
| 2007/0260866 A1 | 11/2007 | Wang et al. |
| 2008/0065845 A1 | 3/2008 | Montero et al. |
| 2008/0209198 A1 | 8/2008 | Majni et al. |
| 2008/0294838 A1 | 11/2008 | Houston et al. |
| 2008/0313312 A1 | 12/2008 | Flynn et al. |
| 2008/0320204 A1 | 12/2008 | Jo et al. |
| 2009/0063810 A1 | 3/2009 | Garcia-Tobin |
| 2009/0172623 A1 | 7/2009 | Cross et al. |
| 2009/0182995 A1 | 7/2009 | Muir |
| 2009/0307481 A1 | 12/2009 | Wisecup et al. |
| 2010/0115228 A1* | 5/2010 | Parker ................ G06F 12/0284 711/203 |
| 2010/0287363 A1 | 11/2010 | Thorsen |
| 2011/0016300 A1 | 1/2011 | Lee |
| 2011/0258426 A1 | 10/2011 | Mujtaba et al. |
| 2012/0042257 A1 | 2/2012 | Aftab et al. |
| 2012/0072897 A1 | 3/2012 | Selvam |
| 2012/0278557 A1* | 11/2012 | Wang et al. .................. 711/129 |
| 2012/0311246 A1* | 12/2012 | McWilliams et al. ........ 711/103 |
| 2013/0007430 A1 | 1/2013 | Fan |
| 2013/0185549 A1 | 7/2013 | Hu |
| 2014/0006764 A1 | 1/2014 | Swanson et al. |

OTHER PUBLICATIONS

Office Action received for U.S. Appl. No. 13/536,449, mailed on May 23, 2014.

Notice of Allowance received for U.S. Appl. No. 13/536,449, mailed on Mar. 27, 2015.

* cited by examiner

SHARING SERIAL PERIPHERAL INTERFACE FLASH MEMORY IN A MULTI-NODE SERVER SYSTEM ON CHIP PLATFORM ENVIRONMENT

FIELD

The present disclosure generally relates to the field of electronics. More particularly, some embodiments of the invention generally relate to sharing Serial Peripheral Interface (SPI) flash memory in a multi-node server SoC (System on Chip) platform environment.

BACKGROUND

As processors increase their processing capabilities, one important consideration is power consumption. For example, in mobile computing devices that rely on battery power, it is very important to reduce power consumption to allow for the device to operate while mobile. Power consumption is also important for non-mobile computing devices as excess power consumption may increase costs (e.g., due to additional power usage, increasing cooling requirements, etc.), shorten component life, limit locations at which a device may be used, etc.

Hard disk drives provide a relatively low cost storage solution and are used in many computing devices to provide non-volatile storage. Disk drives however use relatively a lot of power when compared to flash memory (which can also provide a non-volatile storage solution) since a disk drive needs to spin its disks at a relatively high speed and move disk heads relative to the spinning disks to read/write data. All this physical movement generates heat and increases power consumption. To this end, higher end computing devices are migrating towards utilizing flash memory devices that are non-volatile. Also, some flash memory devices may provide higher access speeds and data transfer rates than hard disk drives.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Microserver is a new class of server segment that is based on Server System on Chip (SoC), where maximizing node density is one of the key product requirements. As discussed herein, the terms "node" and "SoC" are interchangeable. Moreover, microserver platforms may also be referred to as "micromodules" where each micromodule contains multiple independent SoC nodes. In turn, each node may be a separate coherent domain and consist of independent Voltage Rails (VRs), VR controller, SPI (Serial Peripheral Interface) flash, boot disk, etc. Furthermore, a plurality of such micromodules may be deployed in a container referred to as "chassis". Generally, SPI (or more generally) serial flash is a small, low-power flash memory that uses a serial interface for sequential data access. Serial flash may require fewer wires on a printed circuit board than parallel flash memories, in part, because it transmits and receives data one bit at a time. This may permit a reduction in board space, power consumption, and total system cost.

Some embodiments discussed herein relate to sharing serial flash memory (such as SPI flash) across multiple (e.g., non-coherent) nodes in a multi-node server SoC platform environment. Such embodiments may maximize the micromodule node density, which may reduce the number of redundant components and also reduce board real-estate requirements and/or costs.

Figure 1:
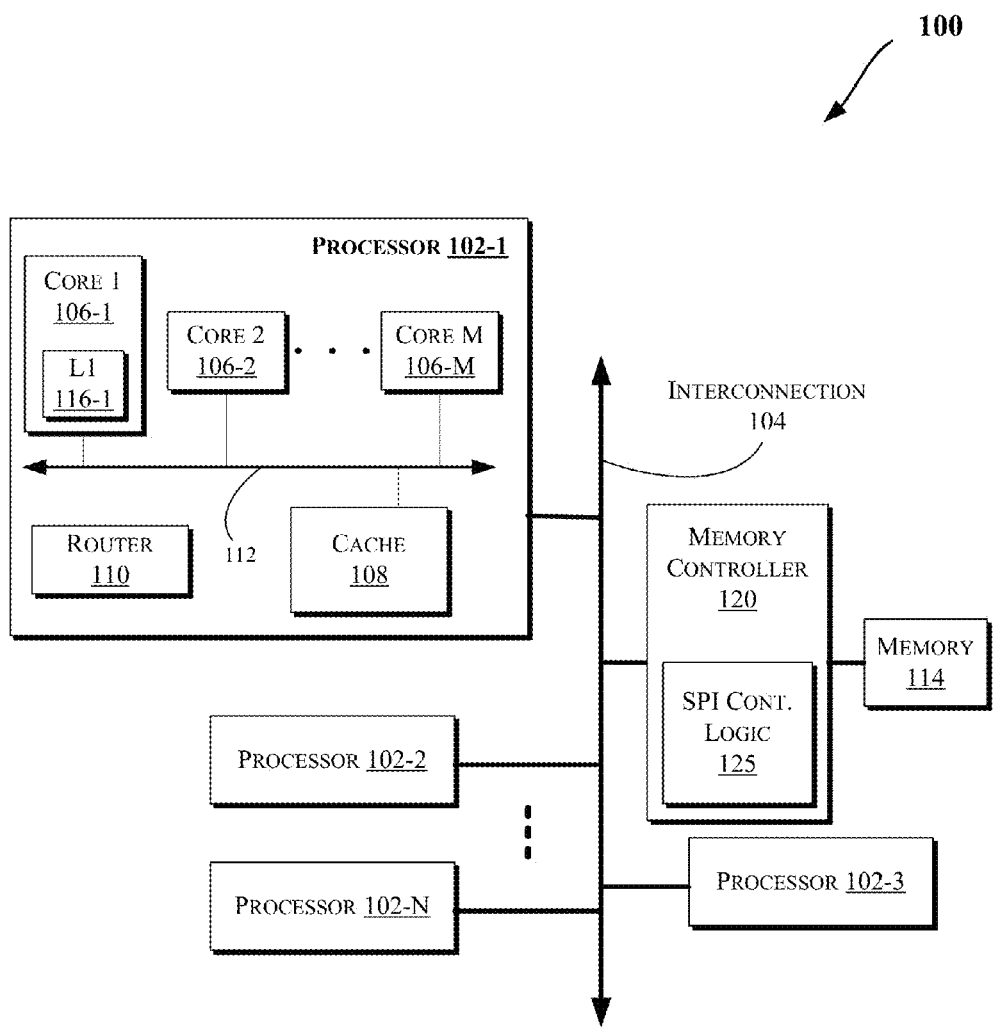
FIGS. 1, 5, and 6 illustrate block diagrams of embodiments of computing systems, which may be utilized to implement various embodiments discussed herein.

Moreover, the memory techniques discussed herein may be provided in various computing systems (e.g., including smart phones, tablets, portable game consoles, Ultra-Mobile Personal Computers (UMPCs), etc.), such as those discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Memory 114 may include non-volatile memory such as SPI and/or eSPI (enhanced SPI) flash memory, etc. in some embodiments. Even though the memory controller 120 is shown to be coupled between the interconnection 102 and the memory 114, the memory controller 120 may be located elsewhere in system 100. For example, memory controller 120 or portions of it may be provided within one of the processors 102 in some embodiments. Also, in some embodiments, system 100 may include logic (e.g., SPI controller logic 125) to control access to one or more Non-Volatile Memory (NVM) devices (e.g., illustrated as memory 114 in FIG. 1, where the one or more NVM devices may be provided on the same integrated circuit die in some embodiments) and/or allow for sharing of the SPI/eSPI flash memory, as discussed herein with respect to various embodiments.

Figure 2:
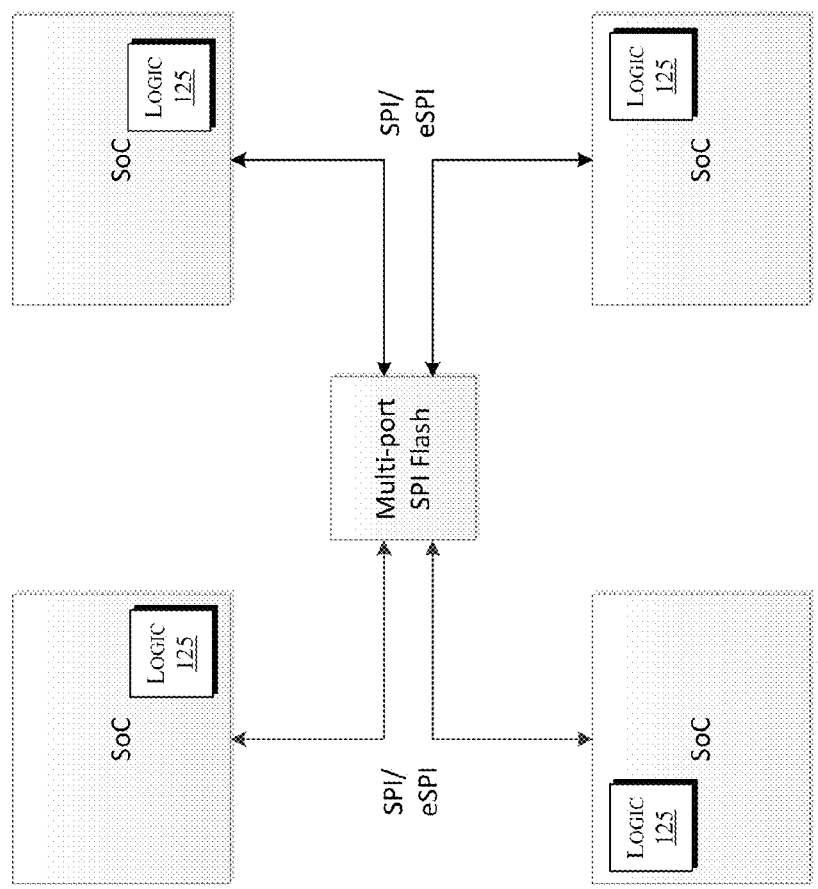
FIG. 2 illustrates a block diagram of a multiple node system according to an embodiment.

FIG. 2 illustrates a block diagram of a multiple node system 200 according to an embodiment. As shown, system 200 may include a plurality of nodes/SoCs that are coupled to a multi-port SPI flash memory via SPI/eSPI links. In an embodiment, system 200 increases node density by reducing redundant components (including the need for multiple SPI flash memory devices for multiple SoCs). As shown, each SoC may include its own SPI controller logic 125; hence, an embodiment transitions the responsibility of SPI flash sharing to the SPI controller 125 of each SoC. In one embodiment, a mechanism is provided to intelligently adjust the address in flash address space depending on the node that is making a request for that address.

Figure 3:
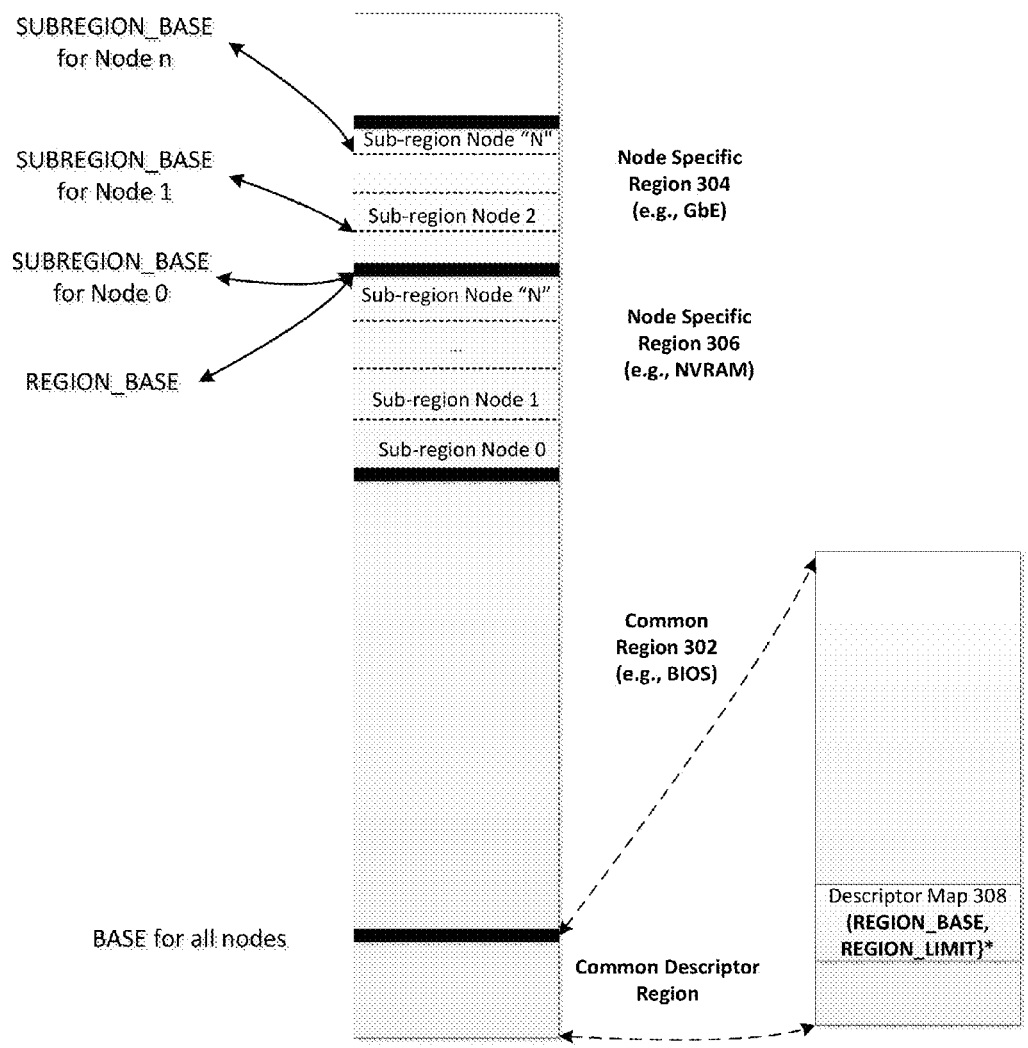
FIG. 3 illustrates a block diagram of memory regions, according to an embodiment.

FIG. 3 illustrates a block diagram of memory regions, according to an embodiment. As shown, SPI flash in a descriptor mode is divided into one or more regions and a descriptor region describes the layout of all the other regions contained in the SPI flash. Each region may have an associated base address and limit address that defines its start linear address and the end linear address. Base and Limit may be 4K aligned absolute addresses in the SPI flash's Linear Address space. Some current SPI flash architecture may support only one region per region type, so when SPI flash is shared all regions become common to all nodes, which does not work for some critical data/code that needs to be node specific, for example NVRAM (Non-Volatile Random Access Memory) region and GbE (Gigabit Ethernet) region. In one embodiment, a common region 302 is defined which is identical for all nodes and node specific sub-regions 304/306 are defined for code/data that need to be specific to each node as shown in FIG. 3.

In some embodiments, the SPI Flash device may be mapped to the host system address space and the SPI controller 125 may translate the host referenced address (64b, 32b) to SPI flash's Linear Address space (27b), and then to SPI flash's Physical Address space (26b). The SPI flash controller 125 may also enforce access control by ensuring that the address accessed by a platform agent (e.g., GbE controller or host) falls within base and limit addresses as described in the descriptor region map 308. There may also be other access control checks in place as not all agents can access all regions of the SPI flash.

Figure 4:
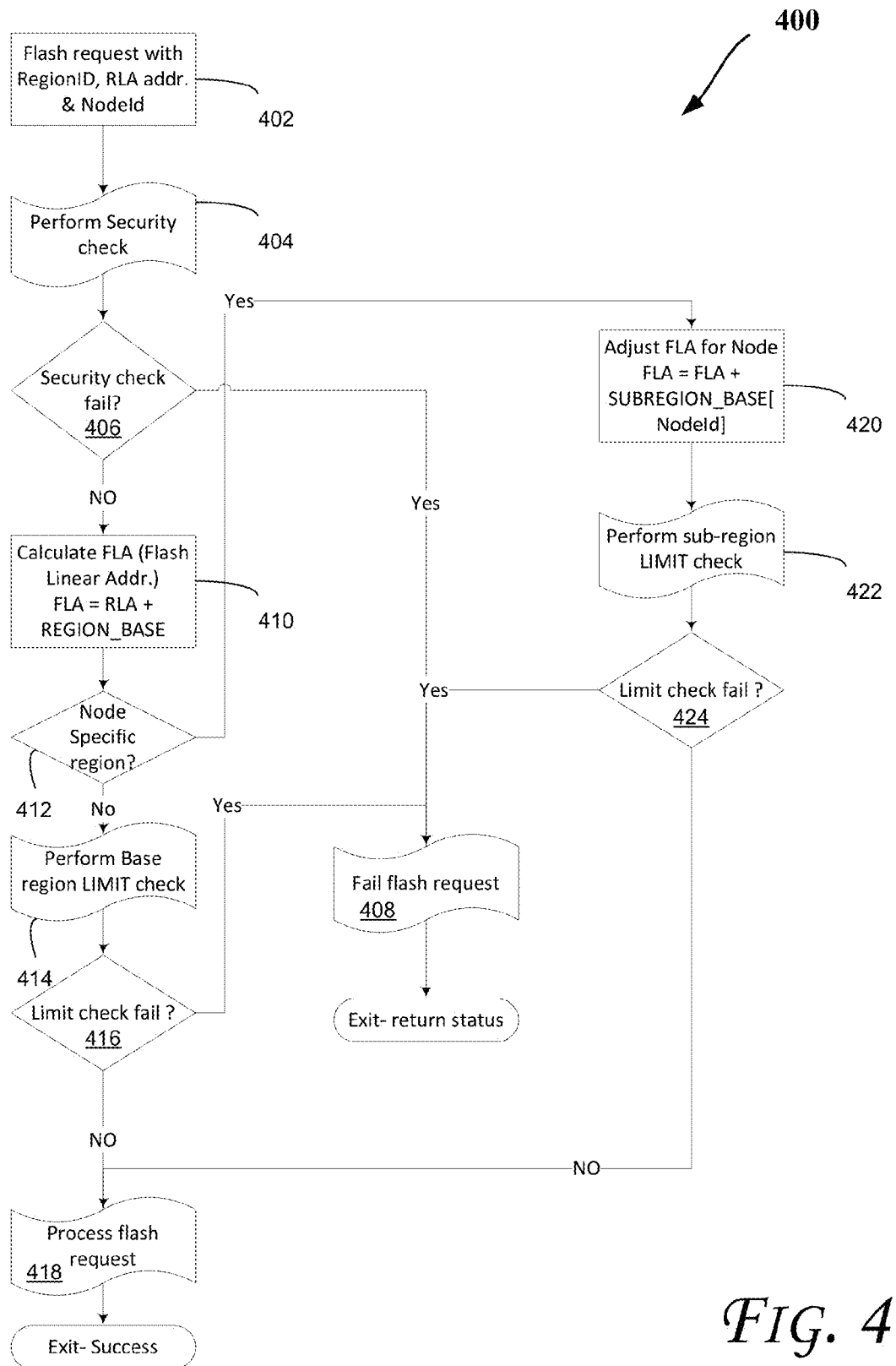
FIG. 4 illustrates a flow diagram of a method for flash address translation, according to an embodiment.

FIG. 4 illustrates a flow diagram of a method 400 for flash address translation in accordance with an embodiment. Various components discussed with reference to FIGS. 1-3 and 5-6 (such as logic 125) may be used to perform one or more of the operations of method 400 in some embodiments. As shown in FIG. 4, on every SPI flash access by a given agent within a node, the SPI controller 125 automatically adjust the Flash Linear Address (FLA) if the accessed region is node-specific. Therefore if the accessed region is node-specific, the FLA of the address accessed will be automatically translated to within one of the sub-regions while imposing no changes to system agents, firmware, BIOS (Basic Input/Output System), and/or OS (Operating System) drivers.

Referring to FIG. 4, at an operation 402 a flash request with region identifier (ID), RLA (Register Load Address), and node ID is received. At an operation 404, a security check may be performed (e.g., to determine whether the access request is allowed, for example, as discussed with reference to the descriptor region map 308 of FIG. 3). If the security check fails (as determined at operation 406), method 400 may continue with operation 408 where the flash request is failed and exit/return is reached. Otherwise, if the security check passes at operation 406, FLA is determined at operation 410.

At an operation 412, it may be determined whether the FLA corresponds to a node specific region. If not, a base region limit check is performed at operation 414, followed by a check on whether the limit has failed at operation 416. If the limit check does not fail, the flash request is processed at operation 418 (with exit/success reached). Otherwise, if the limit check fails at operation 416, method 400 resumes with operation 408.

If the FLA is determined to correspond to a node specific region at operation 412, the FLA for the node is adjusted at an operation 420 (e.g., where Region_Size=REGION_LIMIT−REGION_BASE; SUB-REGION_BASE[NodeID]=NodeID*Region_Size). At an operation 422, a sub-region limit check may be performed (e.g., where FLA<(REGION_LIMIT+n*Region_Size)). If the limit check fails at an operation 424, method 400 resumes with operation 408; otherwise, method 400 resumes with operation 418.

Some embodiments reduce BOM (Bill of Materials) cost by removing (n−1) SPI flash devices from the micromodule and just requiring one multi-ported SPI/eSPI flash memory. Also, securely updating common regions (like BIOS) once is sufficient to reflect for all nodes which reduces complexity. Furthermore, instead of requiring individual SPI flash per node (e.g., 2 socket) to enable per node boot, embodiments that utilize flash sharing (e.g., even the high-end 8+ socket servers) can reduce multiple flash part requirements by moving the flash to a common back-plane. Additionally, some embodiments enforce visibility of a sub-region within a node specific region thus providing isolation for each node for all critical node-specific data and code. Hence, even if one node is "viral" other nodes will be protected.

Figure 5:
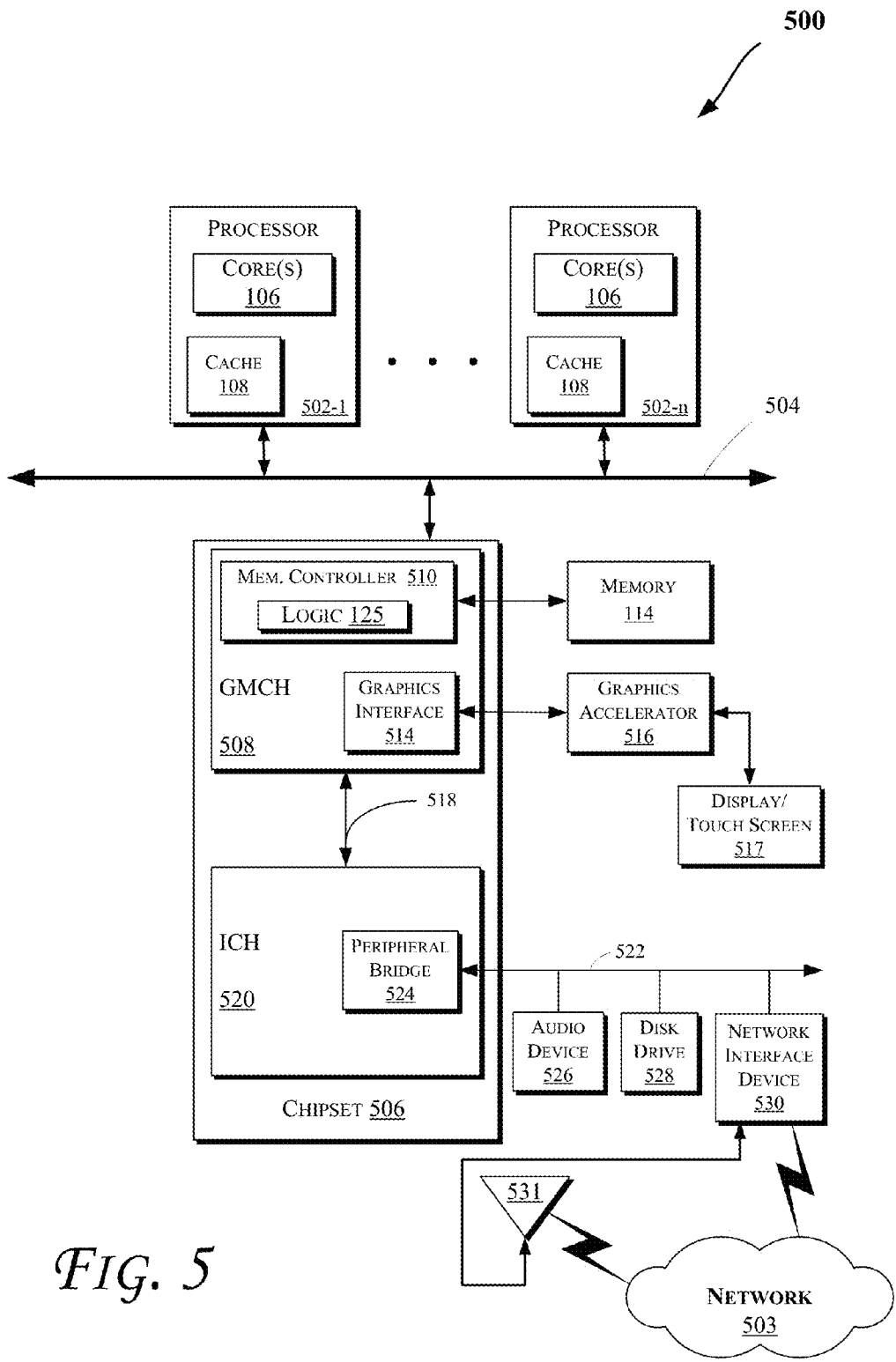

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), an application processor (such as those used in cell phones, smart phones, etc.), or other types of a processor (including a reduced instruction set computer (RISC) processor or a complex instruction set computer (CISC)). Various types of computer networks 503 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 5G, Low Power Embedded (LPE), etc.). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment, e.g., including the logic 125) that communicates with the memory 114. The memory 114 may store data, including sequences of instructions that are executed by the CPU 502, or any other device included in the computing system 500. In one embodiment of the invention, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display 517 (such as a flat panel display, touch screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 517.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers.

The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503, e.g., via a wired or wireless interface). As shown, the network interface device 530 may be coupled to an antenna 531 to wirelessly (e.g., via an Institute of Electrical and Electronics Engineers (IEEE) 802.11 interface (including IEEE 802.11a/b/g/n, etc.), cellular interface, 3G, 5G, LPE, etc.) communicate with the network 503. Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
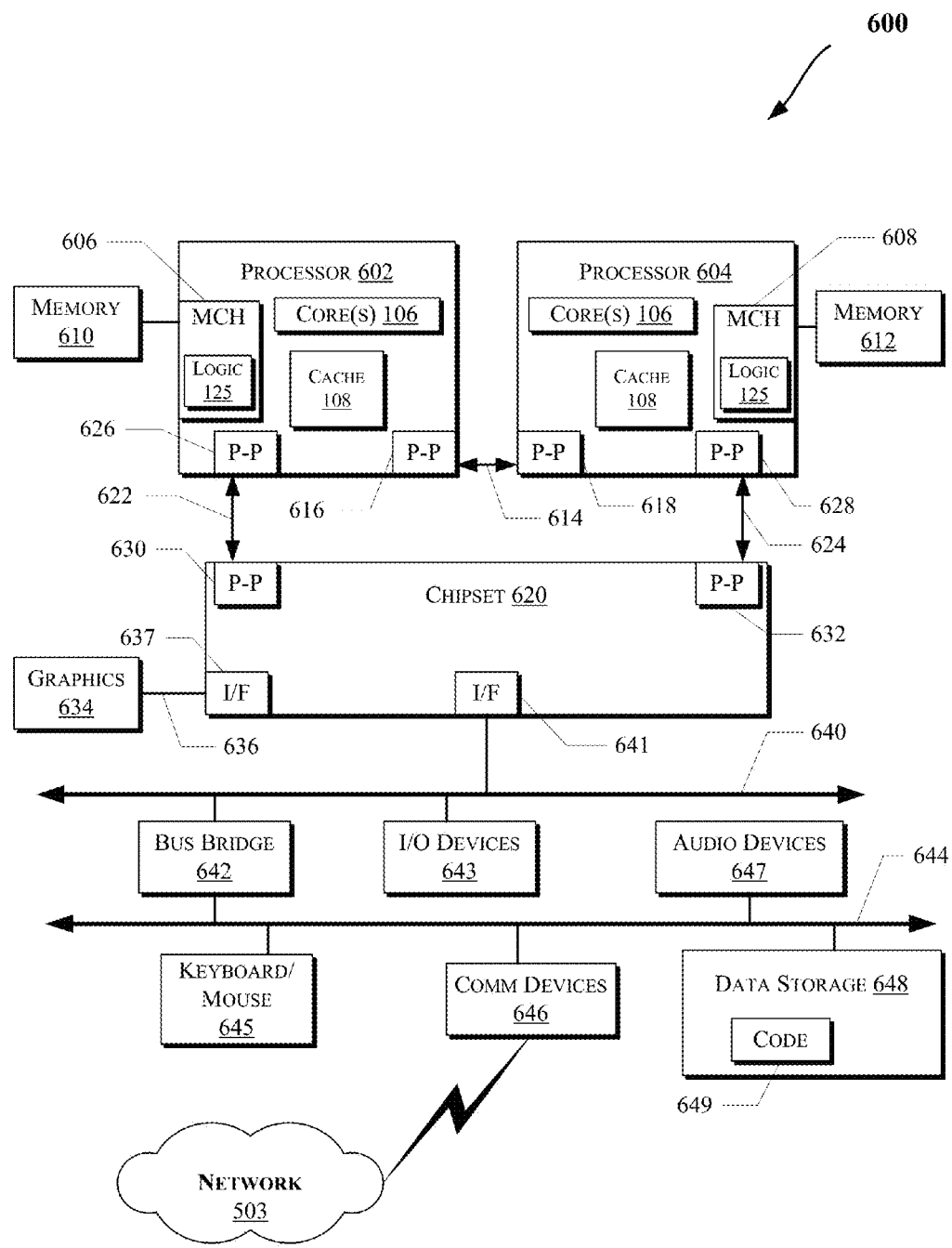

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1 and/or 5. Also, MCH 606 and 608 may include the memory controller 120 and/or logic 125 of FIG. 1 in some embodiments.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637. As discussed with reference to FIG.

5, the graphics interface 636 may be coupled to a display device (e.g., display 517) in some embodiments.

As shown in FIG. 6, one or more of the cores 106 and/or cache 108 of FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 643 may communicate with other devices such as a keyboard/mouse 645, communication devices 646 (such as modems, network interface devices, or other communication devices that may communicate with the computer network 503, as discussed with reference to network interface device 530 for example, including via antenna 531), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
multi-port non-volatile memory to be shared by a plurality of System on Chip (SoC) devices,
wherein each of the plurality of SoC devices is to comprise controller logic to control access to the multi-port non-volatile memory and to translate a host referenced address of a memory access request to a linear address space and a physical address space of the multi-port non-volatile memory, wherein the memory access request is to indicate a region identifier, a register load address, and a node identifier to the controller logic, wherein a flash linear address, in the linear address space of the multi-port non-volatile memory, is to be determined based at least in part on the register load address and the region identifier, wherein the flash linear address is to be adjusted based at least in part on a combination of the flash linear address with a subregion identifier in response to a determination that the region identifier identifies a node specific region of the multi-port non-volatile memory, wherein a security check is to be performed prior to the determination of the flash linear address to determine whether the memory access request is allowed based at least in part on a descriptor region map, wherein the descriptor region map is to identify a layout of all remaining regions of the multi-port non-volatile memory, wherein the multi-port non-volatile memory is to comprise one or more node specific regions, wherein the multi-port non-volatile memory is to comprise a common region for all of the plurality of SoC devices, wherein the common region is to comprise the descriptor region map, wherein the layout is to comprise a region base address and a region limit value for each region of the multi-port non-volatile memory.

2. The apparatus of claim 1, wherein the multi-port non-volatile memory is to comprise a multi-port flash memory.

3. The apparatus of claim 1, wherein the multi-port non-volatile memory is to comprise a multi-port Serial Peripheral Interface (SPI) flash memory.

4. The apparatus of claim 1, wherein the multi-port non-volatile memory and the plurality of SoC devices are to communicate via an SPI or enhanced SPI link.

5. The apparatus of claim 1, wherein the plurality of SoC devices are non-coherent.

6. The apparatus of claim 1, wherein each of the one or more regions is to have an associated base address and a limit address.

7. The apparatus of claim 6, wherein the controller logic is to control access to the multi-port non-volatile memory based on the base address and the limit address.

8. The apparatus of claim 1, wherein the controller logic is to adjust a flash linear address for the memory access request in response to a determination that an accessed region by the memory access request is node specific.

9. The apparatus of claim 1, wherein one or more of the controller logic, the multi-port non-volatile memory, and a processor core are on a same integrated circuit die.

10. The apparatus of claim 1, wherein a memory controller is to comprise the controller logic.

11. A method comprising:
sharing multi-port non-volatile memory amongst a plurality of System on Chip (SoC) devices;
controlling access to the multi-port non-volatile memory via controller logic; and
the controller logic translating a host referenced address of a memory access request to a linear address space and a physical address space of the multi-port non-volatile memory, wherein the memory access request indicates a region identifier, a register load address, and a node identifier to the controller logic, wherein a flash linear address, in the linear address space of the multi-port non-volatile memory, is determined based at least in part on the register load address and the region identifier, wherein the flash linear address is adjusted based at least in part on a combination of the flash linear address with a sub-region identifier in response to a determination that the region identifier identifies a node specific region of the multi-port non-volatile memory, wherein a security check is performed prior to the determination of the flash linear address to determine whether the memory access request is allowed based at least in part on a descriptor region map, wherein the descriptor region map is to identify a layout of all remaining regions of the multi-port non-volatile memory, wherein the multi-port non-volatile memory comprises one or more node specific regions, wherein the multi-port non-volatile memory comprises a common region for all of the plurality of SoC devices, wherein the common region comprises the descriptor region map, wherein the layout comprises a region base address and a region limit value for each region of the multi-port non-volatile memory.

12. The method of claim 11, wherein the multi-port non-volatile memory and the plurality of SoC devices are to communicate via an SPI or enhanced SPI link.

13. The method of claim 11, further comprising partitioning the multi-port non-volatile memory into one or more node specific regions.

14. The method of claim 13, wherein each of the one or more regions is to have an associated base address and a limit address.

15. The method of claim 14, further comprising the controller logic controlling access to the multi-port non-volatile memory based on the base address and the limit address.

16. The method of claim 13, further comprising the controller logic adjusting a flash linear address for the memory access request in response to a determination that an accessed region by the memory access request is node specific.

17. A system comprising:
multi-port non-volatile memory to be shared by a plurality of System on Chip (SoC) devices;
at least one of the plurality of SoC devices to comprise a processor to access data stored on the multi-port non-volatile memory via a controller logic;
wherein the controller logic is to control access to the multi-port non-volatile memory and to translate a host referenced address of a memory access request to a linear address space and a physical address space of the multi-port non-volatile memory, wherein the memory access request is to indicate a region identifier, a register load address, and a node identifier to the controller logic, wherein a flash linear address, in the linear address space of the multi-port non-volatile memory, is to be determined based at least in part on the register load address and the region identifier, wherein the flash linear address is to be adjusted based at least in part on a combination of the flash linear address with a sub-region identifier in response to a determination that the region identifier identifies a node specific region of the multi-port non-volatile memory, wherein a security check is to be performed prior to the determination of the flash linear address to determine whether the memory access request is allowed based at least in part on a descriptor region map, wherein the descriptor region map is to identify a layout of all remaining regions of the multi-port non-volatile memory, wherein the multi-port non-volatile memory is to comprise one or more node specific regions, wherein the multi-port non-volatile memory is to comprise a common region for all of the plurality of SoC devices, wherein the common region is to comprise the descriptor region map, wherein the layout is to comprise a region base address and a region limit value for each region of the multi-port non-volatile memory.

18. The system of claim 17, wherein the multi-port non-volatile memory is to comprise a multi-port flash memory.

19. The system of claim 17, wherein the multi-port non-volatile memory is to comprise a multi-port Serial Peripheral Interface (SPI) flash memory.

20. The system of claim 17, wherein the multi-port non-volatile memory and the plurality of SoC devices are to communicate via an SPI or enhanced SPI link.

21. The system of claim 17, wherein the plurality of SoC devices are non-coherent.

22. The system of claim 17, wherein each of the one or more regions is to have an associated base address and a limit address, wherein the controller logic is to control access to the multi-port non-volatile memory based at least in part on the base address and the limit address.

23. The system of claim 17, wherein the controller logic is to adjust a flash linear address for the memory access request in response to a determination that an accessed region by the memory access request is node specific.

24. The apparatus of claim 1, wherein the node identifier is to identify a node corresponding to one of the plurality of SOC devices.

25. The apparatus of claim 1, wherein the sub-region identifier is to identify a sub-region within the node specific region of the multi-port non-volatile memory.

26. The apparatus of claim 1, wherein the sub-region identifier is to identify a sub-region within the node specific region, wherein the sub-region is to store node-specific data and code for each node of the plurality of SOC devices.

* * * * *